United States Patent [19]

Loechel et al.

[11] 4,345,006

[45] Aug. 17, 1982

[54] METHOD OF TREATING LEATHER

[75] Inventors: Hans-Peter Loechel, Belper; Tom Cooper, Hardingstone, both of England

[73] Assignee: Röhm GmbH, Darmstadt, Fed. Rep. of Germany

[21] Appl. No.: 292,943

[22] Filed: Aug. 14, 1981

[30] Foreign Application Priority Data

Aug. 18, 1980 [DE] Fed. Rep. of Germany ....... 3031187

[51] Int. Cl.$^3$ ........................................ B32B 9/04

[52] U.S. Cl. .................................. 428/473; 8/94.21; 252/8.57; 427/389; 427/412

[58] Field of Search .................... 427/389, 412, 430.1, 427/421; 428/473; 8/94.19 R, 94.21, 94.23; 260/29.6 TA; 252/8, 57

[56] References Cited

U.S. PATENT DOCUMENTS

| | | | |
|---|---|---|---|
| 1,976,679 | 10/1934 | Fikentscher et al. | 8/94.21 |
| 2,768,056 | 10/1956 | Kirk | 8/94.18 |
| 3,408,319 | 10/1968 | Rau | 260/23 AR |
| 3,945,792 | 3/1976 | Würmli et al. | 8/94.21 |
| 4,187,074 | 2/1980 | Träubel et al. | 8/94.19 R |
| 4,239,671 | 12/1980 | Fink et al. | 260/29.6 TA |
| 4,312,914 | 1/1982 | Guth | 427/389 X |
| 4,314,802 | 2/1982 | Beier et al. | 252/8.57 X |

FOREIGN PATENT DOCUMENTS

| | | |
|---|---|---|
| 1930225 | 2/1970 | Fed. Rep. of Germany . |
| 2749386 | 5/1979 | Fed. Rep. of Germany . |
| 7810632 | of 0000 | Netherlands . |
| 425201 | 3/1935 | United Kingdom . |
| 585135 | 1/1947 | United Kingdom . |
| 271704 | 9/1970 | U.S.S.R. . |
| 507648 | 4/1976 | U.S.S.R. . |

OTHER PUBLICATIONS

Stather, "Gerbereichemie und Gerbereitechnologie", Academie Verlag, Berlin (1967), pp. 607–608.

Siebott, "Tylose in der Lederindustrie".

*Primary Examiner*—Thurman K. Page

*Attorney, Agent, or Firm*—Curtis, Morris & Safford

[57] ABSTRACT

What are disclosed are methods for treating tanned leather with a dispersion of an acrylate resin comprising certain acrylate and/or methacrylate esters, an hydroxyalkyl acrylate or methacrylate, an unsaturated polymerizable anionic compound such as an unsaturated carboxylic acid, a crosslinking monomer, and, optionally, acrylamide or methacrylamide, as well as the leathers produced by these methods.

8 Claims, No Drawings

METHOD OF TREATING LEATHER

The present invention relates to a method for treating (impregnating) tanned leather with a hydrophilic acrylate resin, particularly with an aqueous dispersion of such a resin, irreversibly to coat the leather with the resin. Treatment of leather with synthetic polymer resins, particularly in the form of dispersions, is recommended from various points of view, such as for "resin tanning", as a binder for a leather-finish, as a filler, etc.

In a critical evaluation, W. Pauckner, in Leder-und Haeutemarkt ("Leather-and Hide-Market") 51, 607–619 (1976) nevertheless determined that the recommended agents were not conclusive: "Resin tannings" with condensation resins for example have the disadvantage that they readily lead to hardening of the leather. Methods for depositing esters of acrylic acid and methacrylic acid in vegetable tanned leather could not be accepted in practice since they were too complicated and too expensive, in addition to which the absorption of water vapor was impaired as well as imparting too great a stiffness thereto. Experiments involving polymerizable substances used with untanned skins also exist, the intention of which is the achievement of a tanning effect. However, the leathers obtained were too "empty" and neither the tanning process nor a "bottom leather impregnation" based on the same principles could find practical acceptance. As a result, there has been no lack of attempts to overcome the aforementioned difficulties.

At first it was attempted to deposit completely polymerized commercial polymeric resins in middle splits of bull hides and in sheep skins (W. Pauckner, loc. cit.). These commercial products were treated after wetting-back the intermediately dried leather (normal wet-back), whereby between 1 and 5 percent of dry solids, by dry weight of the leather, were introduced. In further experiments, monomers were introduced into the leather itself and polymerization was subsequently carried out. Methyl methacrylate, ethyl acrylate, and butyl acrylate were the components of the homopolymers. Copolymers employed similarly comprised the aforementioned monomers. In copolymers of ethyl acrylate and butyl acrylate, acrylic acid and additional methacrylic acid were added in amounts totalling 7 percent.

According to Pauckner, loc. cit., the use of butyl acrylate involves disadvantages from various viewpoints. In the case of products which comprise pure butyl acrylate or in the case of copolymers which contain a considerable portion of butyl acrylate, it became clearly evident that the water uptake of the leather decreased more and more, since the ability of the leather to swell, or its capacity for absorbing water, is very strongly suppressed by the butyl residue.

German patent publication No. 19 30 225 proposes auxiliaries for the treatment of hides, particularly for the tanning thereof, which comprise copolymers of an unsaturated organic acid having a copolymerizable double bond and a quaternized tertiary amine, at least one of the substituents of which amine has a copolymerizable double bond. For example, a copolymer comprising 115 parts of monomeric acrylic acid with a 65 percent solids content and 31.5 parts of dimethylaminoethyl methacrylate, quaternized with methyl sulfate and containing 80 percent solids content is mentioned. According to DE-OS No. 19 30 225, the auxiliary agents obtained in this way are introduced on tanning or retanning of the skin. However, they can also be added already to pickling baths, in which conventional mineral acids and organic acids are used.

It has now been found that, surprisingly, the quality of tanned leather can be positively affected, without any detriment to its breathability or transmission of water vapor, if the leather is treated with an acrylate resin forming soft films and having predominantly hydrophilic properties. Unexpectedly, leather treated in this manner is fuller. The leather is also particularly good, inter alia, for subsequent embossing.

The present invention particularly relates to the use of hydrophilic film-forming acrylate resins which are copolymers comprising:

60–85, preferably 75–80, parts by weight of an ester of acrylic acid and/or of methacrylic acid, which ester is known to form homopolymers or copolymers having a glass transition temperature of less than 0° C., particularly ethyl acrylate;

10–20 parts by weight of an hydroxyalkyl ester of acrylic acid and/or of methacrylic acid of the formula $$CH_2{=}\overset{R}{\overset{|}{C}}{-}\overset{O}{\overset{\|}{C}}{-}O{-}(CHR_1)_n{-}OH,$$

wherein $R_1$ is hydrogen or alkyl having 1 to 2 carbon atoms, R is hydrogen or methyl, and n is an integer from 2 to 8 inclusive, particularly 2-hydroxyethyl acrylate or 2-hydroxyethyl methacrylate;

1–10, preferably 2–7.5, parts by weight of a polymerizable anionic compound such as itaconic acid, maleic acid, fumaric acid, crotonic acid, acrylic acid, and/or methacrylic acid, preferably in the form of a water soluble salt thereof, such as an alkali metal or ammonium salt;

0.2–2.5, preferably 0.5–1.5, parts by weight of at least one crosslinking monomer; and, finally, 0–2.5 parts by weight of acrylamide or methacrylamide.

The use of resins of the aforementioned type in the form of an aqueous dispersion is particularly preferred. The use of dispersions of resins comprising 60–85, preferably 75–80, percent by weight of ethyl acrylate; 10–20, preferably about 15, percent by weight of 2-hydroxyethyl acrylate; 2.5–7.5, preferably 5, percent by weight of an alkali metal salt of a polymerizable acid, particularly of itaconic acid and particularly the potassium salt thereof; 1–1.5 percent by weight of N-methylolacrylamide or N-methylolmethacrylamide as a crosslinking monomer; and 0.5–1.0 percent by weight of acrylamide or methacrylamide has proved particularly interesting.

In general, the esters of acrylic acid employed are esters of alcohols, preferably alkanols, having 2–18 carbon atoms. The methacrylate esters comprise alcohols, preferably alkanols, having 4–18 carbon atoms.

The glass transition temperatures of homopolymers of such esters are known in the art. The glass transition temperature of copolymers formed between such monomers can be calculated in advance from the formula taught by T. G. Fox in the Bull. Am. Phys. Soc. 1, 123 (1956).

Film hardness is a concept well known in the art as discussed, for example, in "Acryl-und Methacrylverbindungen" ("Acrylic and Methacrylic Compounds"), Springer Verlag, Berlin, 1967, pages 303–305.

The polymerizable anionic compound present as a comonomer is preferably an $\alpha,\beta$-mono-unsaturated monobasic or dibasic carboxylic acid having 3 to 5 carbon atoms, preferably an alkenoic acid.

As used in the present specification and claims, the term "crosslinking monomer" is to be understood as primarily encompassing those known monomers which, in addition to a polymerizable group, contain reactive (functional) groups whose reaction with each other (internal cross-linking) or by way of added polyfunctional compounds (external cross-linking) leads to joining the polymer chains. As reactive groups, amide, acid, nitrile, and particularly N-methylolamide and N-methylol-etheramide functions are suitable, for example. These react in a known fashion with reactive groups of the same type or—to the extent that different cross-linkable monomers are present or may be formed—react with other suitable reactive groups as reaction partners and in this way bring about the cross-linking. Monomers of this type include, for example, acrylamide, methacrylamide, N-methylol-acrylamide, N-methylol-methacrylamide, acrylonitrile, acrylic acid and methacrylic acid. Internal cross-linking can, for example, occur between two N-methylolamide groups with the formation of a methylol ether or of a methylene-bis compound. Also, the reaction between a N-methylol-amide group and an amide can be used for the formation of a methylene-bis compound. Internal cross-linking can also occur by the reaction of a nitrile group with an amide group. As an example of external cross-linking, the reaction of an amide group with a formaldehyde donor is mentioned, which leads to the aforementioned joined products by way of a N-methylol compound.

In addition to the aforementioned crosslinking monomers having reacting (functional) groups, monomers having two or more reactive double bonds (for example diols or polyols esterified with methacrylic acid, or allyl methacrylate, or allyl cyanurate, etc.) can be used to a lesser degree for joining the polymer chains. As examples of monomers having several reactive double bonds, ethylene glycol diacrylate, ethylene glycol dimethacrylate, 1,4-butylene glycol diacrylate, 1,4-butylene glycol dimethacrylate, 1,6-hexanediol diacrylate and dimethacrylate, N,N'-methylene-bis-acrylamide and bis-methacrylamide, vinyl acrylate and vinyl methacrylate, triallyl cyanurate, and diallyl ether can be mentioned.

Crosslinking reactions are discussed by Grawe et al., J. of Coatings Technology, 50 (No. 641), 41–55 (1978) and 50 (No. 643), 67–83 (1978).

The preparation of film-forming acrylate resins of the aforementioned type is known in the art. They can, for example, be made according to methods taught in German patent publication DE-OS No. 27 49 386 (=U.S. Pat. No. 4,239,671) or in published Dutch patent application NE-OS No. 78 10 632. The preparation of dispersions of hydrophilic film-forming resins according to the present invention can take place by polymerization in an aqueous medium in a manner known in the art.

Polymerization of the monomers can be initiated in conventional fashion by the use of initiators such as azo compounds or per compounds (cf. the Polymer Handbook by Immergut-Brandrup). Likewise, conventional emulsifiers, chain transfer agents, and the like can be used. The polymerization can be carried out using ordinary techniques for emulsion polymerization.

Application of the resin to tanned leather can take place by treating the leather in a float containing a resin dispersion, for example in a paddle-vat, drum, or tanning machine, or by dipping, pouring, sprinkling, spraying and the like. In general, aqueous resin dispersions are employed.

A better understanding of the present invention and of its many advantages will be had by referring to the following specific Examples, given by way of illustration.

EXAMPLE 1

Preparation of an Acrylate Dispersion 0.2 Part by weight of the sodium salt of a sulfated addition product of triisobutylphenol and 7 mols of ethylene oxide (emulsifier A) and 0.02 part by weight of potassium peroxydisulfate are dissolved in 61.5 parts by weight of completely desalted water at 80° C. in a polymerization vessel equipped with a reflux condenser, stirring apparatus, thermometer, and dropping funnel. An emulsion, earlier prepared from 78 parts by weight of ethyl acrylate, 15 parts by weight of 2-hydroxyethyl acrylate, 5 parts by weight of dipotassium itaconate, 1.2 parts by weight of N-hydroxymethyl methacrylamide, 0.8 part by weight of methacrylamide, 2.3 parts by weight of emulsifier A, 1 part by weight of the addition product of isononylphenol and 100 mols of ethylene oxide (emulsifier B), 0.18 part by weight of potassium peroxydisulfate, and 94 parts by weight of desalted water, are introduced into this solution at 80° C. over a period of 4 hours. After addition is complete, the reaction temperature is retained for one further hour at 80° C. and the mixture is then cooled at room temperature. A dispersion free of coagulate and having a solids content of about 40 percent is obtained.

EXAMPLE 2

Preparation of an Acrylate Dispersion 0.5 Part by weight of the sodium salt of tetradecane sulfonic acid (emulsifier C) and 0.03 part by weight of ammonium peroxydisulfate are dissolved in 80 parts of completely desalted water present in a reaction vessel like that of Example 1.

An emulsion comprising 40 parts by weight of methylacrylate and 35 parts by weight of propyl acrylate, 3 parts by weight of hydroxyethyl methacrylate, 15 parts by weight of hydroxyethyl acrylate, 5 parts by weight of dipotassium itaconate, 1.2 parts by weight of hydroxymethyl acrylamide, and 0.8 part by weight of methacrylamide, together with 1.8 parts of emulsifier C, 1.5 parts by weight of the addition product of isooctylphenol and 50 mols of ethylene oxide (emulsifier D), 0.17 part by weight of ammonium peroxydisulfate, and 75.5 parts by weight of completely desalted water is added at 75° C. over a period of 6 hours to the solution in the reaction vessel, the contents of which are stirred during the first 5½ hours of addition. After addition is concluded, the mixture is left for another 2 hours at 75° C. and then cooled.

An easily filtrable dispersion having a solids content of about 39 percent is obtained.

The following Examples showing the use of acrylate dispersions illustrate the method of the present invention. In the Examples, the proteolytic activity of the proteases mentioned is determined in the usual fashion according to the Anson hemoglobin method [M. L. Anson, J. Gen. Physiol. 22, 79 (1939)].

In the following Examples, units derived from the Anson-method were employed for determining the activity of those enzymes which are effective in the acid region. These units are characterized as "Proteinase-Units (Hemoglobin)", $U_{Hb}$. One $U_{Hb}$ corresponds to the amount of enzyme which catalyzes the liberation, from hemoglobin, of fragments soluble in trichloroacetic acid equivalent to one micromol of tyrosine per minute at 37° C. (measured at 280 nm). 1 $mU_{Hb}=10^{-3}U_{Hb}$.

EXAMPLE 3

Sheep Clothing Leather (a) (1) Starting material: Pickled, chromium-tanned leather from New Zealand sheep. The leather is washed with water at 40° C. and then combined with 100 percent of water at 40° C. 2 percent of an acid bating agent, commercially available under the tradename "Eropic DVP" and containing an acid protease having an activity of 30 $mU_{Hb}$/mg (at pH=7.5), are added. The batch is stirred at intervals over a period of 3-5 hours. The liquor is run off and the hides are neutralized with 25 percent sodium bicarbonate solution.

(a) (2) Treatment with resin dispersion.

100 Percent of water (40° C.) and 3 percent of an acrylate dispersion prepared according to Example 1 are added. The batch is agitated for 10–15 minutes. Retanning follows in the same bath. The percentage figures pertain to the shaved weight of the leather.

(b) (1) Starting materials: Pickled English sheepskins, chromium tanned.

The skins are neutralized (in a drum) with 200 percent of water (25° C.) and 2 percent of sodium bicarbonate, with agitation for 30 minutes. The float is run off. The skins are washed.

(b) (2) Treatment with resin dispersion.

150 Percent of water (40° C.) and 0.5 percent of the acrylate dispersion of Example 1 are added to the skins and agitation is carried out for 15 minutes. The skins are retanned and greased in the same bath.

EXAMPLE 4

Shoe Upper Leather (a) (1) Starting material: Wet blues

The skins are washed with 120 percent of water (55° C.) in a drum 0.2 percent of a non-ionic emulsifier, such as an ethoxylated nonylphenol (commercially available under the tradename "Rohagal 12N"), are added. The batch is agitated for one hour and the float is then run off.

The skins are now enzymatically opened-up (in the drum) with 100 percent of water (50° C.). The pH is adjusted to 4.0 with formic acid. 4 percent of an acid bating agent containing an acid protease with an activity of 30 mU/mg are added (pH-7.5). The batch is agitated for one hour. The skins are treated overnight for 16 hours. During the night, the batch is agitated 3 or 4 times for a period of five minutes. On the next morning, the float is run off and the skins are washed with warm water.

(a) (2) Treatment with resin dispersion and retanning (drum):

100 Percent of water (45° C.) and 5 percent of an acrylate dispersion according to Example 1 are added to the skins and the batch is agitated for 10–15 minutes. 4 percent of powdered mimosa extract, 4 percent of powdered chestnut extract, and 2 percent of a synthetic disperse tanning agent comprising a phenol-naphthalene condensation product are added and the batch is agitated for 45 minutes.

(b) (1) The treatment of chromium-retanned calf-skin with resin dispersion:

The skins are washed (in a drum) with 250 percent of water (50° C.) with agitation for 10 minutes and the float is run off.

Treatment with dispersion follows in the drum in 100% of water (40° C.) using 1 percent of an acrylate dispersion according to Example 1, with agitation for 15 minutes.

Retanning, dyeing, and greasing follow in the same float.

EXAMPLE 5

Tanned East-Indian Goat Skins

The skins are washed in a drum with 200 percent of water at 40° C. with agitation for 30 minutes. The float is then run off.

Treatment with a dispersion and retanning follow in the drum using 100 percent of water and 5 percent of an acrylate dispersion according to Example 1, with agitation, for 15 minutes. 3 percent of a 33 percent basic chrome tanning agent containing 20–25 percent of $Cr_2O_3$ are added and the batch is agitated for 45 minutes. The float is then run off and the skins are washed. Dyeing and greasing follow as usual.

Surprisingly, the leathers obtained according to these Examples were fuller. A loose grain was made tighter without the leather becoming too stiff. Dyeing was uniform. Calf skin acquired more stand. Despite the use of dispersions of relatively soft resins, the leather becomes firmer, in effect. It is also surprising that, despite the small amounts of materials used, the static charge of the leather is decreased. Another surprising effect is that, in leather treated according to the invention which is subsequently embossed, the impression is better developed and is retained longer than in leathers treated according to the state of the art.

What is claimed is:

1. A method for treating tanned leather which comprises contacting the leather with a dispersed acrylate resin comprising 60–85 parts by weight of at least one member selected from the group consisting of esters of acrylic acid and esters of methacrylic acid, the homopolymers or copolymers of which esters have a glass transition temperature less than 0° C.;

10–20 parts by weight of at least one hydroxyalkyl acrylate or methacrylate of the formula $$H_2C{=}\overset{\displaystyle R}{\overset{|}{C}}{-}\overset{\displaystyle O}{\overset{\|}{C}}{-}O{-}(CHR_1)_n{-}OH,$$

wherein R is hydrogen or methyl, $R_1$ is hydrogen or alkyl having 1 to 2 carbon atoms, and n is an integer from 2 to 8, 1–10 parts by weight of an $\alpha,\beta$-monounsaturated monobasic or dibasic carboxylic acid having 3 to 5 carbon atoms or of a water soluble salt of such an acid;

0.2–2.5 parts by weight of a crosslinking monomer; and

0–2.5 parts by weight of acrylamide or methacrylamide.

2. A method as in claim 1 wherein said resin comprises ethyl acrylate.

3. A method as in claim 1 wherein said resin comprises a member selected from the group consisting of itaconic acid, maleic acid, fumaric acid, crotonic acid, acrylic acid, methacrylic acid, and the water soluble salts of these acids.

4. A method as in claim 3 wherein said member is dipotassium itaconate.

5. A treated tanned leather made by the method of claim 1.

6. A treated tanned leather made by the method of claim 2.

7. A treated tanned leather made by the method of claim 3.

8. A treated tanned leather made by the method of claim 4.

* * * * *